United States Patent [19]
Yoon

[11] Patent Number: 5,550,680
[45] Date of Patent: Aug. 27, 1996

[54] THIN FILM ACTUATED MIRROR ARRAY HAVING AN IMPROVED OPTICAL EFFICIENCY

[75] Inventor: Dong-Seon Yoon, Seoul, Rep. of Korea

[73] Assignee: Daewoo Electronics Co., Ltd., Seoul, Rep. of Korea

[21] Appl. No.: 346,958

[22] Filed: Nov. 30, 1994

[30] Foreign Application Priority Data

Nov. 30, 1993 [KR] Rep. of Korea ............... 93-25880

[51] Int. Cl.$^6$ .................. G02B 5/08; G03B 21/28; G03B 21/14
[52] U.S. Cl. .................. 359/850; 359/295; 359/851; 353/99; 353/38
[58] Field of Search ............... 359/850, 851, 359/883, 884, 889, 892, 893, 224, 229, 291; 355/53; 353/38, 98, 122; 348/771; 310/328, 366; 29/25.35

[56] References Cited

U.S. PATENT DOCUMENTS

| | | | |
|---|---|---|---|
| 3,463,572 | 8/1969 | Preston, Jr. | 359/295 |
| 3,904,274 | 9/1975 | Feinleib et al | 359/295 |
| 4,111,538 | 9/1978 | Sheridon | 353/122 |
| 4,985,926 | 1/1991 | Foster | 310/366 |
| 5,056,912 | 10/1991 | Hamada et al. | 353/38 |
| 5,140,396 | 8/1992 | Needham et al. | 357/30 |
| 5,175,465 | 12/1992 | Um et al. | 310/328 |
| 5,185,660 | 2/1993 | Um | 348/771 |
| 5,260,798 | 11/1993 | Um et al. | 358/233 |
| 5,287,215 | 2/1994 | Warde et al. | 359/291 |
| 5,301,404 | 4/1994 | Ochiai et al. | 29/25.35 |
| 5,376,857 | 12/1994 | Takeuchi et al. | 310/328 |
| 5,379,081 | 1/1995 | Kim et al. | 353/99 |
| 5,423,207 | 6/1995 | Flechsig | 310/366 |

FOREIGN PATENT DOCUMENTS 9112560  8/1991  WIPO ................. 353/38

Primary Examiner—Paul M. Dzierzynski
Assistant Examiner—Mohammad Y. Sikder
Attorney, Agent, or Firm—Anderson Kill Olick & Oshinsky, P.C.

[57] ABSTRACT

An array of M×N thin film actuated mirrors for use in an optical projection system, comprises an active matrix, an array of M×N actuating structures, an array of M×N mirror layers and an array of M×N supporting members. Each of the actuating structures includes a first and a second identically structured actuating parts, each of the first and second actuating parts having at least a thin film layer of a motion-inducing material, a first and a second electrodes. The first electrodes from each of the first and second actuating parts are physically joined, thereby serving as the common bias electrode, and the second electrodes function as the signal electrode. Furthermore, each of the mirror layers is divided into a first and a second reflectors. Each of the reflectors is provided with a first surface, a second opposing surface and a central tab portion therebetween. The central tab portion of each reflector is directly secured on top of each actuating part such that when the central tab portion in each of the reflectors deforms in response to an electrical signal, the first and second opposing surfaces in each of the reflectors tilt while remaining planar, thereby allowing all of the first and second opposing surfaces to reflect light beams, resulting in an increased optical efficiency.

7 Claims, 4 Drawing Sheets

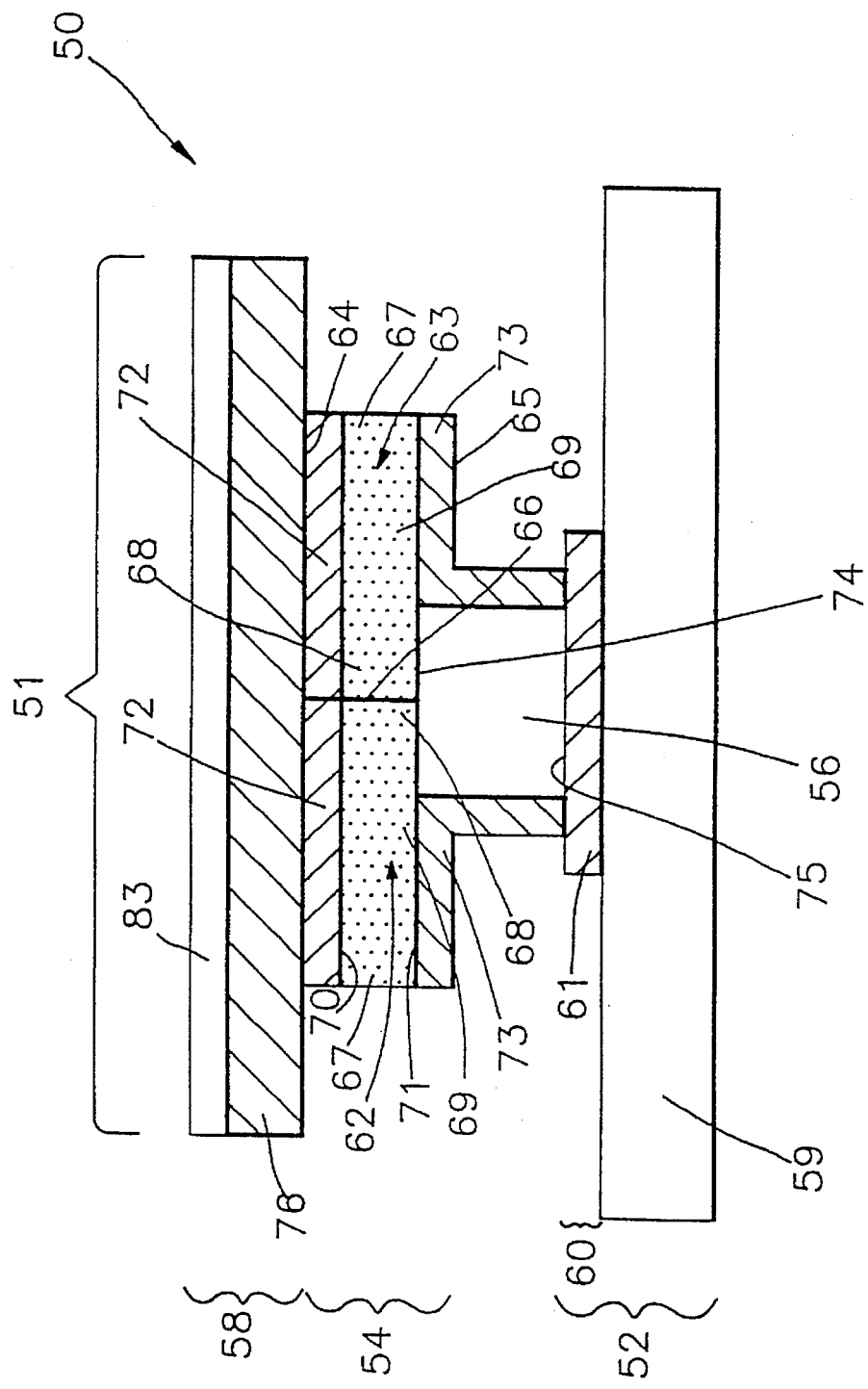

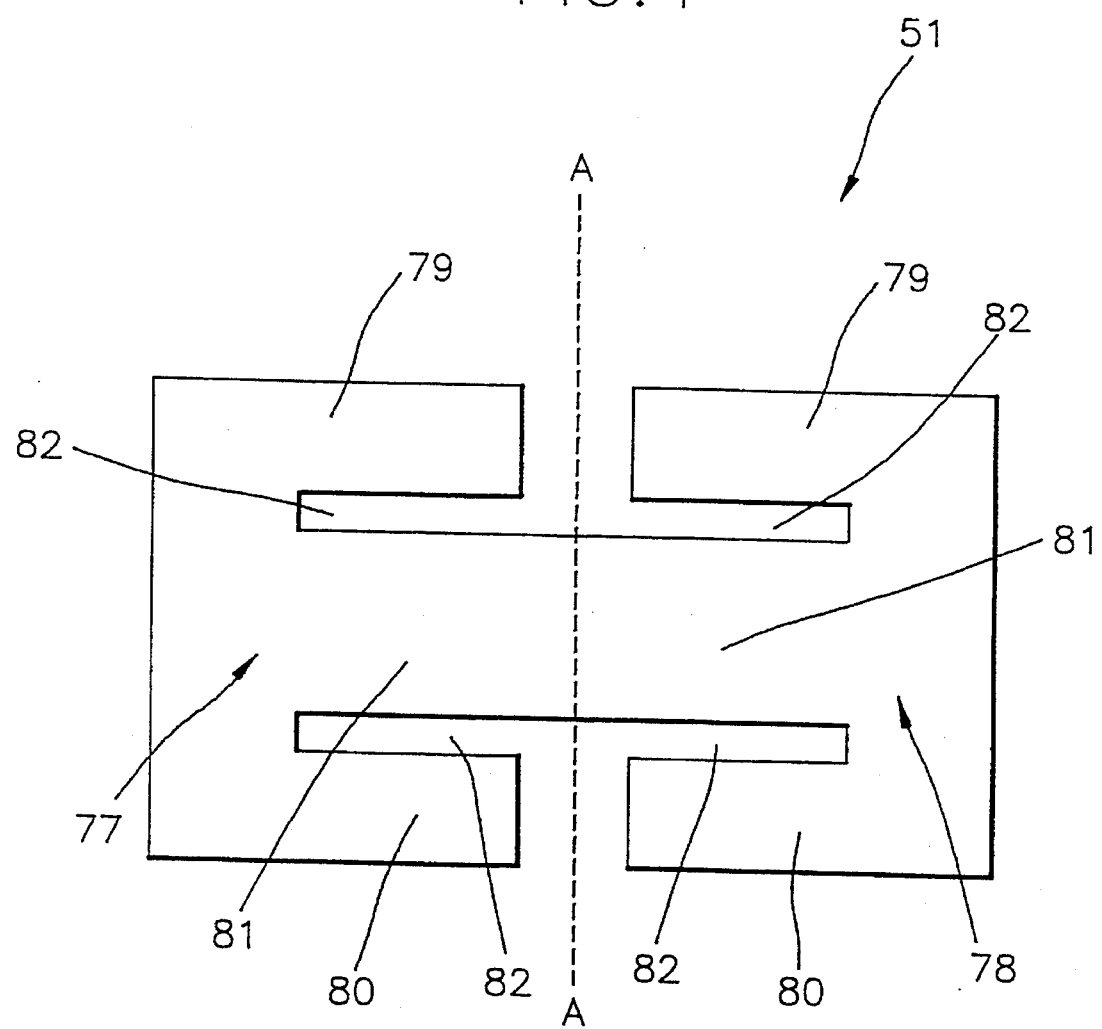

THIN FILM ACTUATED MIRROR ARRAY HAVING AN IMPROVED OPTICAL EFFICIENCY

FIELD OF THE INVENTION

The present invention relates to an optical projection system; and, more particularly, to an array of M×N thin film actuated mirrors for use in the system having an improved optical efficiency.

BACKGROUND OF THE INVENTION

Among the various video display systems available in the art, an optical projection system is known to be capable of providing a high quality display in a large scale. In such an optical projection system, light from a lamp is uniformly illuminated onto an array of, e.g., M×N, actuated mirrors such that each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of a baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIG. 1, there is shown a cross sectional view of an array 10 of M×N thin film actuated mirrors 5 for use in an optical projection system, disclosed in a copending commonly owned application, U.S. Ser. No. 08/331,399, entitled "THIN FILM ACTUATED MIRROR ARRAY AND METHOD FOR THE MANUFACTURE THEREOF", comprising: an active matrix 11 including a substrate 12, an array of M×N transistors (not shown) and an array 13 of M×N connecting terminals 14; an array 15 of M×N thin film actuating structures 16, each of the actuating structures 16 having at least a thin film layer 17 of a motion-inducing material, a first electrode 18 and a second electrode 19, the first and second electrodes being placed on top and bottom of the thin film motion-inducing layer 17, respectively; an array 20 of M×N supporting members 21, each of the supporting members 21 being used for holding each of the actuating structures 16 in place by cantilevering each of the actuating structures 16 and also for electrically connecting each of the actuating structures 16 and the active matrix 11; and an array 22 of M×N mirrors 23 for reflecting light beams, each of the mirrors being placed on top of each of the actuating structures 16. In the thin film actuated mirror array 10, an electrical signal is applied across the thin film layer 17 of the motion-inducing material located between the pair of electrodes 18, 19 in each of the actuating structures 16, causing a deformation thereof, which will in turn deform the mirror 23 placed on top thereof, thereby changing the optical path of the incident light beam.

One of the major problems associated with the above described thin film actuated mirror array is the overall optical efficiency of the array 10. When each of the actuating structures 16 deforms in response to the electric field applied across the thin film motion-inducing layer 17 thereof, the mirror 23 attached thereto also deforms. However, in the array 10, the portion of the mirror 23 secured to the supporting member 21 does not deform in response to the electric field, but remains securely in place. As a result, the effective length of the mirror 23 becomes reduced by the length of the portion of the actuating structure 16 secured to the supporting member 21, thereby limiting the overall optical efficiency of the array 10.

SUMMARY OF THE INVENTION

It is, therefore, a primary object of the present invention to provide an array of M×N actuated mirrors having an improved optical efficiency.

In accordance with one aspect of the present invention, there is provided an array of M×N thin film actuated mirrors for use in an optical projection system, the array comprising: an active matrix including a substrate, an array of M×N transistors and an array of M×N connecting terminals; an array of M×N thin film actuating structures, each of the actuating structures including a first and a second actuating parts, the first and second actuating parts being identically structured, each of the first and second actuating parts being provided with a top, a bottom and a side surfaces, and a proximal and a distal ends, each of the first and second actuating parts having at least a thin film layer of a motion-inducing material including a top and a bottom surfaces, each of the first and second actuating parts further being provided with a first and a second electrodes with the first electrode being placed on the top surface of the motion-inducing thin film layer, and the second electrode, on the bottom surface of the motion inducing layer, the side surface from each of the actuating parts in each of the actuating structures being in physical contact with each other, the first electrode from each of the first and second actuating parts in each of the actuating structures being common to the first and second actuating parts, thereby functioning as a common bias electrode, the second electrodes from each of the first and second actuating parts in each of the actuating structures functioning as a signal electrode in the corresponding actuating part, wherein an electrical signal applied across the motion-inducing thin film layer between the first and second electrodes in each actuating part causes a deformation of the motion-inducing thin film layer, and hence said each actuating part; an array of M×N supporting members, wherein the proximal end of the actuating parts of each of the actuating structures is secured to the corresponding supporting member; and an array of M×N mirror layers, each of the mirror layers including a mirror for reflecting light beams and a supporting layer, each of the mirror layers being divided into a first and a second reflectors, the first and second reflectors being symmetric to each other, each of the reflectors being provided with a first surface, a second opposing surface and a central tab portion therebetween, the first surface and central tab portion, and the second opposing surface and central tab portion being separated by a dividing slot therebetween, wherein the central tab portion of each reflector is directly attached on top of each actuating part in each of the actuating structures such that when the central tab portion in each of the reflectors deforms in response to the electrical signal, the first and second opposing surfaces in each of the reflectors tilt while remaining planar, thereby allowing all of the first and second opposing surfaces to reflect light beams, resulting in an increased optical efficiency.

BRIEF DESCRIPTION OF THE DRAWINGS

The above and other objects and features of the present invention will become apparent from the following description of preferred embodiments given in conjunction will the accompanying drawings, wherein:

FIG. 3 depicts a detailed cross sectional view of a thin film actuated mirror in the inventive thin film actuated mirror array shown in FIG. 2; and FIG. 4 illustrates a top view of the thin film actuated mirror shown in FIG. 3.

DETAILED DESCRIPTION OF THE PREFERRED EMBODIMENTS

Figure 1:
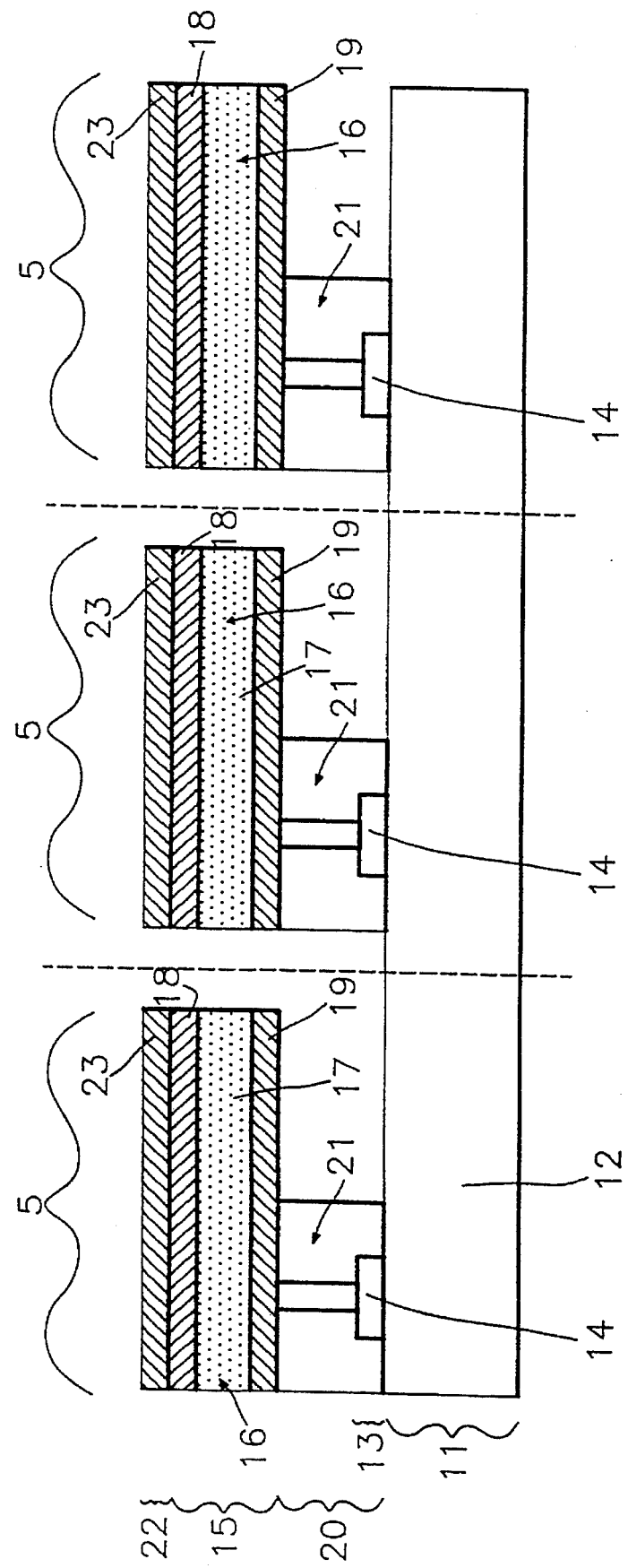
FIG. 1 shows a cross sectional view of an array of M×N thin film actuated mirrors previously disclosed.
Figure 2:
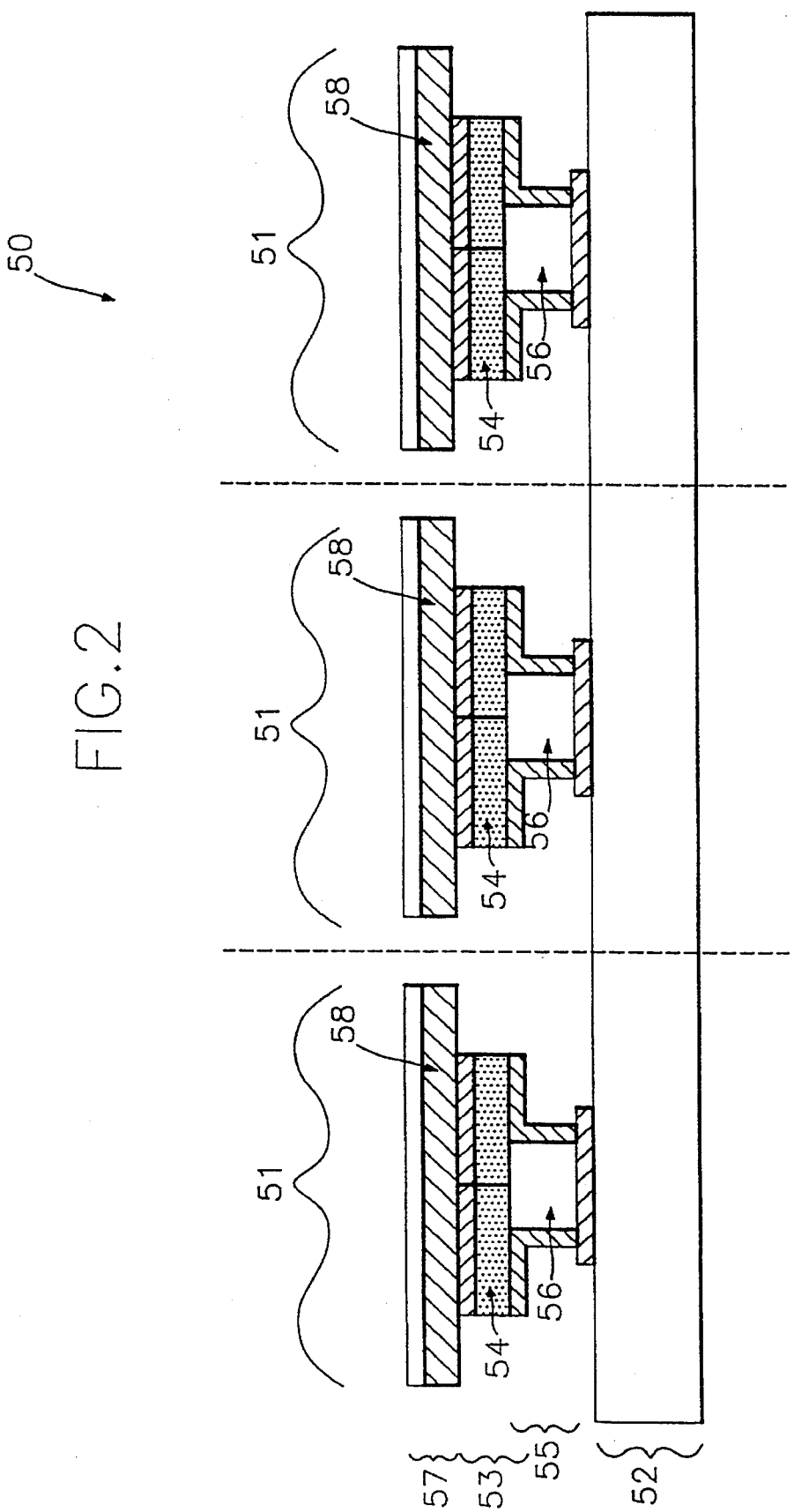
FIG. 2 represents a cross sectional view of an array of M×N thin film actuated mirrors in accordance with a preferred embodiment of the present invention.

Referring now to FIGS. 2 to 4, there are provided two schematic cross sectional and a top views of the inventive array of M×N thin film actuated mirrors for use in an optical projection system, wherein M and N are integers, in accordance with preferred embodiments of the present invention. It should be noted that like parts appearing in FIGS. 2 to 4 are represented by like reference numerals.

In FIG. 2, there is illustrated a cross sectional view of an array 50 of M×N thin film actuated mirrors 51, comprising an active matrix 52, an array 53 of M×N thin film actuating structures 54, an array 55 of M×N supporting members 56, and an array 57 of M×N mirror layers 58.

FIG. 3 represents a detailed cross sectional view of the thin film actuated mirror array 50 shown in FIG. 2. The active matrix 52 includes a substrate 59, an array of M×N transistors (not shown) and an array 60 of M×N connecting terminals 61. Each of the thin film actuating structures 54 includes a first and a second identically structured actuating parts 62, 63, wherein each of the first and second actuating parts 62, 63 is provided with a top, a bottom and a side surfaces 64, 65, 66, and a distal and a proximal ends 67, 68. Each of the first and second actuating parts 62, 63 is further provided with a thin film layer 69 of a motion-inducing material including a top and a bottom surfaces 70, 71, e.g., a piezoelectric material or an electrostrictive material, a first and a second electrodes of a specific thickness 72, 73 with the first electrode 72 being disposed on the top surface 70 of the motion-inducing thin film layer 69, and the second electrode 73, on the bottom surface 71 thereof. If the motion-inducing thin film layers 69 are made of a piezoelectric material, e.g., lead zirconium titanate(PZT), they must be poled in the same direction. The first and second electrodes 72, 73 are made of an electrically conducting metal, e.g., silver(Ag) or gold(Au). In the thin film actuating structure 54, the side surfaces 66 from each of the-first and second actuating parts 62, 63 are in physical contact with each other. Furthermore, the first electrodes 72 from each of the first and second actuating parts 62, 63 are physically in contact with each other, thereby functioning as a common bias electrode, and the second electrodes 73 function as a signal electrode in the respective actuating parts 62, 63. An electrical signal applied across the motion-inducing thin film layer 69 between the first and second electrodes 72, 73 in each of the actuating parts 62, 63 causes a deformation of the motion-inducing thin film layer 69, and hence the actuating parts 62, 63.

Each of the M×N supporting members 56, provided with a top and a bottom surface 74, 75, is used for holding each of the actuating parts 62, 63 in place and also for electrically connecting each of the actuating structures 54 with the corresponding connecting terminal 61 on the active matrix 52.

In this inventive array 50 of M×N thin film actuated mirrors 51, each of the first and second actuating parts 62, 63 in each of the actuating structures 54 is cantilevered from each of the supporting members 56 by being mounted on the top surface 74 of each of the supporting members 56 at bottom of each of the first and second actuating parts 62, 63 at the proximal end 68 thereof, and the bottom surface 75 of each of the supporting members 56 is placed on top of the active matrix 52. The second electrodes 73 from each of the first and second actuating parts 62, 63 are connected to the corresponding connecting terminal 61. The supporting members are made of a ceramic.

Each of the mirror layers 58 includes a mirror 83 for reflecting light beams and a supporting layer 76, wherein each of the mirror layers 58 is divided into a first and a second reflectors 77, 78, the first and second reflectors 77, 78 being symmetric with each other with respect to a dotted line A—A, shown in FIG. 4 representing a top view of a thin film actuated mirror 51 in the inventive array 50. Each of the reflectors 77, 78 is provided with a first surface 79, a second opposing surface 80, and a central tap portion 81 therebetween, the first surface 79 and central tab portion 81, and the second opposing surface 80 and central tab portion 81 being separated by a dividing slot 82 therebetween. The central tab portion 80 of the reflectors 77, 78 is directly attached on top of each actuating part 63, 64 in each of the actuating structures 54 such that when the central tab portions 81 in each of the reflectors 77, 78 deform in response to the electrical signal, the first and second opposing surfaces 79, 80 in each of the reflectors 77, 78 tilt while remaining planar, and as a result, the effective length of the mirror layer 58 becomes the entire length of the first and second opposing surfaces 79, 80 of each of the reflectors, resulting in a net increase in optical efficiency over the array 10 disclosed previously. The center tab portions from the first and second reflectors 77, 78 in each of the mirror layers 58 may be physically joined together or disjointed from each other.

While the present invention has been described with respect to certain preferred embodiments only, other modifications and variations may be made without departing from the scope of the present invention as set forth in the following claims.

What is claimed is:

1. An array of M×N thin film actuated mirrors, wherein M and N are integers, for use in an optical projection system, comprising:

a substrate;

an array of M×N thin film actuating structures, each of the actuating structures including a first and a second actuating parts, the first and second actuating parts being identically structured, each of the first and second actuating parts being provided with a top, a bottom and a side surfaces, and a proximal and a distal ends, each of the first and second actuating parts having at least a thin film layer of a motion-inducing material including a top and a bottom surfaces, each of the first and second actuating parts further being provided with a first and a second electrodes with the first electrode being placed on the top surface of the motion-inducing thin film layer, and the second electrode, on the bottom surface of the motion inducing layer, the side surface from each of the actuating parts in each of the actuating structures being in physical contact with each other, the first electrode from each of the first and second actuating parts in each of the actuating structures being common to the first and second actuating parts, thereby functioning as a common bias electrode, the second electrode from each of the first and second actuating parts in each of the actuating structures functioning as a signal electrode in the corresponding actuating part, wherein an electrical signal applied across the motion-inducing thin film layer between the first and second electrodes in each actuating part causes a deformation of the motion-inducing thin film layer, and hence said each actuating part;

an array of M×N supporting members, each of the supporting members being placed on top of the substrate wherein the proximal end of the actuating parts of each of the actuating structures is secured to the corresponding supporting member; and an array of M×N mirror layers, each of the mirror layers including a mirror for reflecting light beams and a supporting layer, each of the mirror layers being divided into a first and a second reflectors, the first and second reflectors being symmetric to each other, each of the reflectors being provided with a first surface, a second opposing surface and a central tab portion therebetween, the first surface and central tab portion, and the second opposing surface and central tab portion being separated by a dividing slot therebetween, wherein the central tab portion of each reflector is directly attached on top of each actuating part in each of the actuating structures such that when the central tab portion in each of the reflectors deforms in response to the electrical signal, the first and second opposing surfaces in each of the reflectors tilt while remaining planar, thereby allowing all of the first and second opposing surfaces to reflect light beams, resulting in an increased optical efficiency.

2. The thin film actuated mirror array of claim 1, wherein each of the supporting members is made of a ceramic.

3. The thin film actuated mirror array of claim 1, wherein the first and second electrodes are made of an electrically conducting material.

4. The thin film actuated mirror array of claim 1, wherein each of the supporting layers is made of a ceramic.

5. The thin film actuated mirror array of claim 1, wherein the motion-inducing thin film layer is made of an electrictive or a piezoelectric material.

6. The thin film actuated mirror array of claim 1, wherein the center tab portions from the first and second reflectors in each of the mirror layers are physically joined together.

7. The thin film actuated mirror array of claim 1, wherein the center tab portions from the first and second reflectors in each of the mirror layers are physically disjoined.

* * * * *